US006992493B2

(12) United States Patent
Yamaoka et al.

(10) Patent No.: US 6,992,493 B2
(45) Date of Patent: Jan. 31, 2006

(54) DEVICE AND METHOD FOR SUBSTRATE DISPLACEMENT DETECTION

(75) Inventors: Shuji Yamaoka, Hiroshima (JP); Shogo Ishioka, Hiroshima (JP)

(73) Assignee: OHT Inc., Hiroshima (JP)

( * ) Notice: Subject to any disclaimer, the term of this patent is extended or adjusted under 35 U.S.C. 154(b) by 125 days.

(21) Appl. No.: 10/478,496

(22) PCT Filed: May 23, 2002

(86) PCT No.: PCT/JP02/04992

§ 371 (c)(1),
(2), (4) Date: Nov. 21, 2003

(87) PCT Pub. No.: WO02/101326

PCT Pub. Date: Dec. 19, 2002

(65) Prior Publication Data

US 2004/0153282 A1 Aug. 5, 2004

(30) Foreign Application Priority Data

May 24, 2001 (JP) ............................. 2001-155534

(51) Int. Cl.
*G01R 27/26* (2006.01)

(52) U.S. Cl. ...................................... 324/662; 324/758

(58) Field of Classification Search ............ 324/158.1, 324/661, 671, 683, 754, 761, 758, 662

See application file for complete search history.

(56) References Cited

U.S. PATENT DOCUMENTS

| | | | |
|---|---|---|---|
| 4,409,087 A | | 10/1983 | Quick |
| 5,281,921 A | * | 1/1994 | Novak et al. ................ 324/671 |
| 5,304,924 A | * | 4/1994 | Yamano et al. ............. 324/758 |
| 6,075,375 A | | 6/2000 | Burkhart et al. |
| 6,353,327 B2 | * | 3/2002 | Nishikawa ................... 324/758 |
| 6,356,093 B2 | * | 3/2002 | Nishikawa et al. ......... 324/758 |
| 6,377,060 B1 | * | 4/2002 | Burkhart et al. ............ 324/754 |

FOREIGN PATENT DOCUMENTS

| | | |
|---|---|---|
| JP | 03-027545 | 2/1991 |
| JP | 04-110703 | 4/1992 |
| JP | 06-020920 | 1/1994 |
| JP | 09-236406 | 9/1997 |
| JP | 10-311861 | 11/1998 |

* cited by examiner

*Primary Examiner*—Walter Benson
(74) *Attorney, Agent, or Firm*—Westerman, Hattori, Daniels & Adrian LLP.

(57) ABSTRACT

Disclosed is an apparatus and method for detecting positional displacement of a board. A board 20 having a surface formed with a conductive pattern 25 is transferred in a direction A while supplying an AC signal from a power supply section 3 to the surface of the board. The level of positional displacement of the board is detected in accordance with the transfer speed of the board and the difference between the timings of the intermediate signal levels generated when the AC signal is sensed by a pair of position sensors 1, 2 opposed to the leading edge of the board. The present invention allows positional displacement of the board to be detected in a simple non-contact structure while maintaining a high degree of accuracy without variation over time.

10 Claims, 3 Drawing Sheets

DEVICE AND METHOD FOR SUBSTRATE DISPLACEMENT DETECTION

TECHNICAL FIELD

The present invention relates to an apparatus and method for detecting positional displacement of a board having a surface formed with a conductive pattern, relative to a direction approximately orthogonal to a transfer direction thereof.

BACKGROUND ART

In order to inspect positional error of a board having a surface formed with a conductive pattern, there has been known an optical or mechanical method for sensing, for example, the leading edge of the board being transferred.

There has also been employed a method in which two pairs of sensors are located, respectively, at orthogonally intersecting portions of a conductive pattern formed on the surface of a board to detect positional displacement of the board in accordance with the difference between sense signals from the sensors, as disclosed in Japanese Patent Laid-Open Publication No. 10-311861.

However, the optical sensing method involves a problem of difficulty in high-accuracy detection due to variation in detection level caused by deterioration in light-emitting means or changes in surrounding atmosphere. The same problem is observed in the mechanical sensing method.

In the method disclosed in the Japanese Patent Laid-Open Publication No. 10-311861, a board is located and fixed at a given position of an apparatus for inspecting the conduction of a wiring pattern, and then the two pairs of sensors each having a width about one-half of the line width of the conductive pattern are disposed, respectively, at portions of the conductive pattern orthogonally intersecting in the X-direction and the Y-direction. Therefore, due to the requirement of providing four high-precision sensors each having a width about one-half of the line width of the conductive pattern, the method is limited to only a particular application.

Thus, it is desired to achieve a board-displacement detection apparatus capable of being arranged at a desired position on a transfer path in a simple structure while maintaining a high degree of accuracy without variation over time.

It is therefore an object of the present invention to provide a board-displacement detection apparatus and method capable of solving the above problems, for example, capable of being arranged at a desired position on a transfer path in a simple structure while maintaining a high degree of accuracy without variation over time.

DISCLOSURE OF INVENTION

In order to achieve the above object, according to a first aspect of the present invention, there is provided an apparatus for detecting positional displacement of a board having a surface formed with a conductive pattern, relative to a direction orthogonal to a transfer direction thereof. The apparatus comprises: at least two pattern-edge sensing means disposed, respectively, at predetermined arrival positions which are spaced apart from each other at a given distance and to be aligned with the leading edge of the conductive pattern located downstream relative to the transfer direction, and adapted to be capacitively coupled with the conductive pattern in a non-contact manner; signal supply means for supplying an AC signal from a given portion of the conductive pattern other than the leading edge to the leading edge; and displacement determination means for sensing the difference between respective timings when the AC signal supplied from the signal supply means is sensed by the pattern-edge sensing means to determine the positional displacement of the board transferred to the predetermined arrival positions. The signal supply means is operable to supply the AC signal at least at the time when the leading edge of the conductive pattern arrives at the predetermined arrival positions, and the displacement determination means is operable to determine the level of inclination of the board in accordance with the level of difference between the sense signals.

In the above apparatus, the displacement determination means may be operable to sense the respective arrival positions of the leading edge to the pattern-edge sensing means, in accordance with the positions of the respective approximately intermediate levels between the minimum and maximum levels in the sense signals from the pattern-edge sensing means, to determine the inclination relative to the line between the positions of the pattern-edge sensing means and the displacement relative to the transfer direction, in accordance with the difference between the sense signals from the pattern-edge sensing means.

The signal supply means may include capacitive coupling means for supplying the AC signal to the given portion of the conductive pattern in a non-contact manner.

The board may be a board for a liquid-crystal display panel. In this case, the conductive pattern may be an indium tin oxide film or an aluminum film. Further, the board for a liquid-crystal display panel may be made of glass or plastic.

According to a second aspect of the present invention, there is provided a method for detecting positional displacement of a board having a surface formed with a conductive pattern, relative to a direction orthogonal to a transfer direction thereof. The method comprises the steps of: providing at least two pattern-edge sensing means disposed, respectively, at predetermined arrival positions which are spaced apart from each other at a given distance and to be aligned with the leading edge of the conductive pattern located downstream relative to the transfer direction, and adapted to be capacitively coupled with the conductive pattern in a non-contact manner; supplying an AC signal to the conductive pattern; sensing the AC signal supplied to the conductive pattern of the board transferred to the predetermined arrival positions, through the pattern-edge sensing means; and detecting the difference between respective timings when the AC signal is sensed by the pattern-edge sensing means to determine the positional displacement of the board transferred to the predetermined arrival positions.

In the above method, the detecting step may include detecting the respective arrival positions of the leading edge to the pattern-edge sensing means, in accordance with the positions of the respective approximately intermediate levels between the minimum and maximum levels in the sense signals from the pattern-edge sensing means, to determine the inclination relative to the line between the positions of the pattern-edge sensing means and the displacement relative to the transfer direction, in accordance with the difference between the sense signals from the pattern-edge sensing means.

BEST MODE FOR CARRYING OUT THE INVENTION

Figure 1:
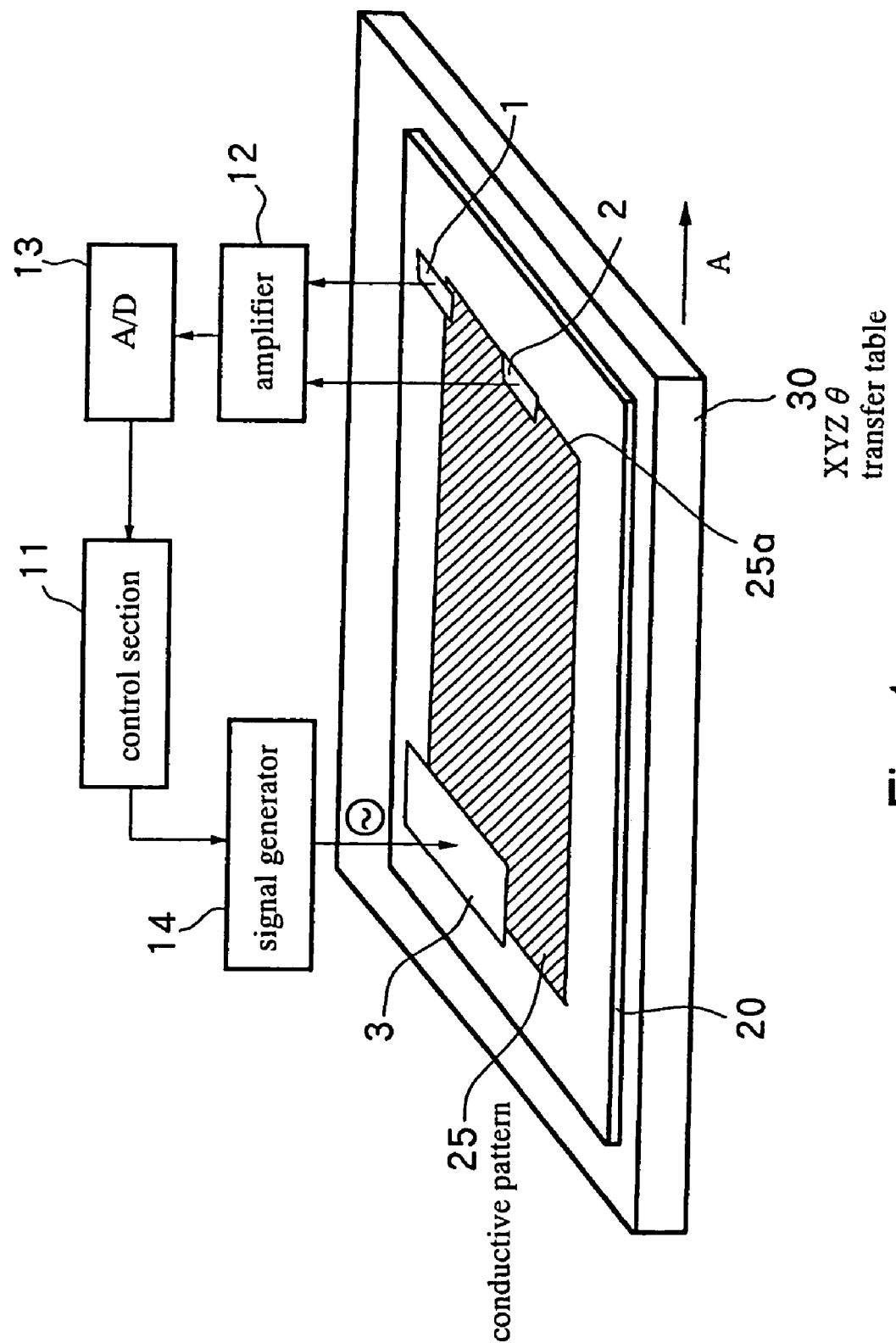
FIG. 1 is an explanatory diagram of the principle of detecting positional displacement of a board in a board-displacement detection apparatus according to one embodiment of the present invention.

With reference to the drawings, one embodiment of the present invention will now be described in detail. The following description will be made in conjunction with a circuit-pattern inspection apparatus for inspecting the quality of a dot matrix pattern of a dot matrix display panel before being assembled as a dot matrix liquid-crystal display. However, the present invention is not limited to such a pattern, but may be applied to any pattern with one end having a plurality of wiring patterns allowing a common sensor to be arranged such that it is capacitively coupled commonly with respective wiring pattern groups at different positions.

In this embodiment, the board-displacement detection apparatus comprises an XYZθ transfer table 30. The XYZθ transfer table 30 can be controlled to 3-dimensionally move a board to be inspected while holding it on the surface thereof and set the board at any position. In an operation of detecting positional displacement of the board, a board 20 having a surface formed with a conductive pattern 25 is held on the XYZθ transfer table 30 controlled to transfer the board, for example, in a direction indicated by the arrow A, and the board-displacement detection apparatus is operable to detect positional displacement of the board 20 relative to a direction approximately orthogonal to the transfer direction A.

In this embodiment, the board 20 is a board for a liquid-crystal display panel, and made of glass. Specifically, the glass board 20 has a surface formed with the conductive pattern 25.

However, the material of the board in present invention is not limited to glass, but any other suitable material having an equivalent function may be used. For example, the board may be made of plastic. The plastic board can achieve the same function as that of the glass board, and reduce the risk of breakage as compared to the glass board. Thus, if the plastic board is used as a substitute for the glass substrate, the inspection can be carried out in the same way without any modification in an after-mentioned control and others.

Preferably, the conductive pattern to be used for detection is formed on the surface of the board 20 to extend in a direction orthogonal to the transfer direction of the board instead of in a direction parallel thereto.

The XYZθ transfer table 30 can be moved not only in the arrow direction A but also in a direction orthogonal to the arrow direction A. Thus, positional displacement of the board relative to a direction parallel to the arrow direction A can be detected by changing the moving direction of the XYZθ transfer table 30 or the transfer direction of the board 20, and the positions of after-mentioned position sensors.

In this embodiment, even if the conductive pattern is arranged in any direction except for a direction parallel to the transfer direction of the board, positional displacement of the board can be detected by appropriately changing the positions of after-mentioned position sensors. The following description will be made by taking an indium tin oxide (ITO) film as an example of the conductive pattern.

The board-displacement detection apparatus according to this embodiment includes two position sensors 1, 2 serving as pattern-edge sensing means disposed, respectively, at two predetermined arrival positions which are spaced apart from one another at a given distance and to be aligned with the leading edge 25a of the conductive pattern 25 located downstream relative to the transfer direction, and adapted to be capacitively coupled with the conductive pattern in a non-contact manner. The board-displacement detection apparatus also includes a power supply section 3 serving as signal supply means for supplying an AC signal from a given portion of the conductive pattern 25 located upstream relative to the transfer direction to the leading edge 25a of the conductive pattern 25. The position sensors 1, 2 and the power supply section 3 are fixedly attached on a sensor panel (not shown) while locating their outer surfaces in one plane.

The position sensors 1, 2 are formed as conductive flat plates having approximately the same area, and the power supply section 3 is also formed as a conductive flat plate. Thus, even if the power supply section 3 is not in contact with the conductive pattern 25 on the surface of the board 20, an AC signal with a certain level of high frequency can be supply to the power supply section 3 while appropriately setting the distance between the surface of the board 20 and the conductive pattern 25 so as to form a capacitive coupling therebetween to allow the AC signal to be supplied to the conductive pattern 25 of the board 20 through the power supply section 3.

For this purpose, the power supply section 3 is connected with a signal generator 14 including an oscillation circuit operable to oscillate at a given frequency, and supplied with an AC signal with the given frequency oscillated by the oscillation circuit.

Then, when the conductive pattern 25 arrives at a position facing to the position sensors 1, 2, a conduction path is formed between the power supply section 3 and the position sensors 1, 2 through the conductive pattern 25 to send the AC signal from the power supply section 3 to an amplifier circuit 12 through the position sensors 1, 2. Then, an A/D converter circuit 13 converts the amplified sense signals from the amplifier circuit 12 into corresponding digital signals, and a control section 11 takes in the digital signals so as to detect the timings when the AC signal is sensed by the position sensors 1, 2 to determine positional displacement of the board 20.

In the apparatus according to this embodiment illustrated in FIG. 1, the position sensors 1, 2 are disposed, respectively, at positions where they can sense the AC signal at the same timing when the board 20 is transferred without any positional displacement. This means that positional displacement of the board 20 is proportional to the level of difference between the respective sense signals of the sensors 1, 2.

However, the present invention is not limited to the above arrangement. For example, even in case where the AC signal is not sensed at the same timing when the board 20 is transferred without any positional displacement, if the level of difference between the respective sense signals of the position sensors 1, 2 is clarified in advance, the positional error of the board 20 can be recognized in accordance with the level of difference between the respective sense signals. Thus, in fundamentally the same way as that in the above embodiment, the level of positional displacement of the board 20 can be determined in accordance with the change between the timings of sensing the AC signal by the position sensors 1, 2 when the board 20 is transferred under a preset condition of no positional displacement and actual timings of sensing the AC signal by the position sensors 1, 2 when the board 20 is transferred under an unknown condition.

The position sensors 1, 2 serving as pattern-edge sensing means disposed, respectively, at two predetermined arrival positions which are spaced apart from one another at a given distance and to be aligned with the leading edge 25a of the conductive pattern 25 located downstream relative to the transfer direction, and adapted to be capacitively coupled with the conductive pattern in a non-contact manner, and the power supply section 3 serving as signal supply means for supplying an AC signal from a given portion of the conductive pattern 25 located upstream relative to the transfer direction to the leading edge 25a of the conductive pattern 25 are fixedly attached on the sensor panel (not shown) while locating their outer surfaces in one plane.

That is, the position sensors 1, 2 are disposed, respectively, at positions where they can sense the AC signal at the same timing when the board 20 is transferred without any positional displacement. This means that positional displacement of the board 20 is proportional to the level of difference between the respective sense signals of the sensors 1, 2.

However, the present invention is not limited to the above arrangement. For example, even in case where the AC signal is not sensed at the same timing when the board 20 is transferred without any positional displacement, if the level of difference between the respective sense signals of the position sensors 1, 2 is clarified in advance, the positional error of the board 20 can be recognized in accordance with the level of difference between the respective sense signals. Thus, in fundamentally the same way as that in the above embodiment, the level of positional displacement of the board 20 can be determined in accordance with the change between the timings of sensing the AC signal by the position sensors 1, 2 when the board 20 is transferred under a preset condition of no positional displacement and actual timings of sensing the AC signal by the position sensors 1, 2 when the board 20 is transferred under an unknown condition.

Figure 2:
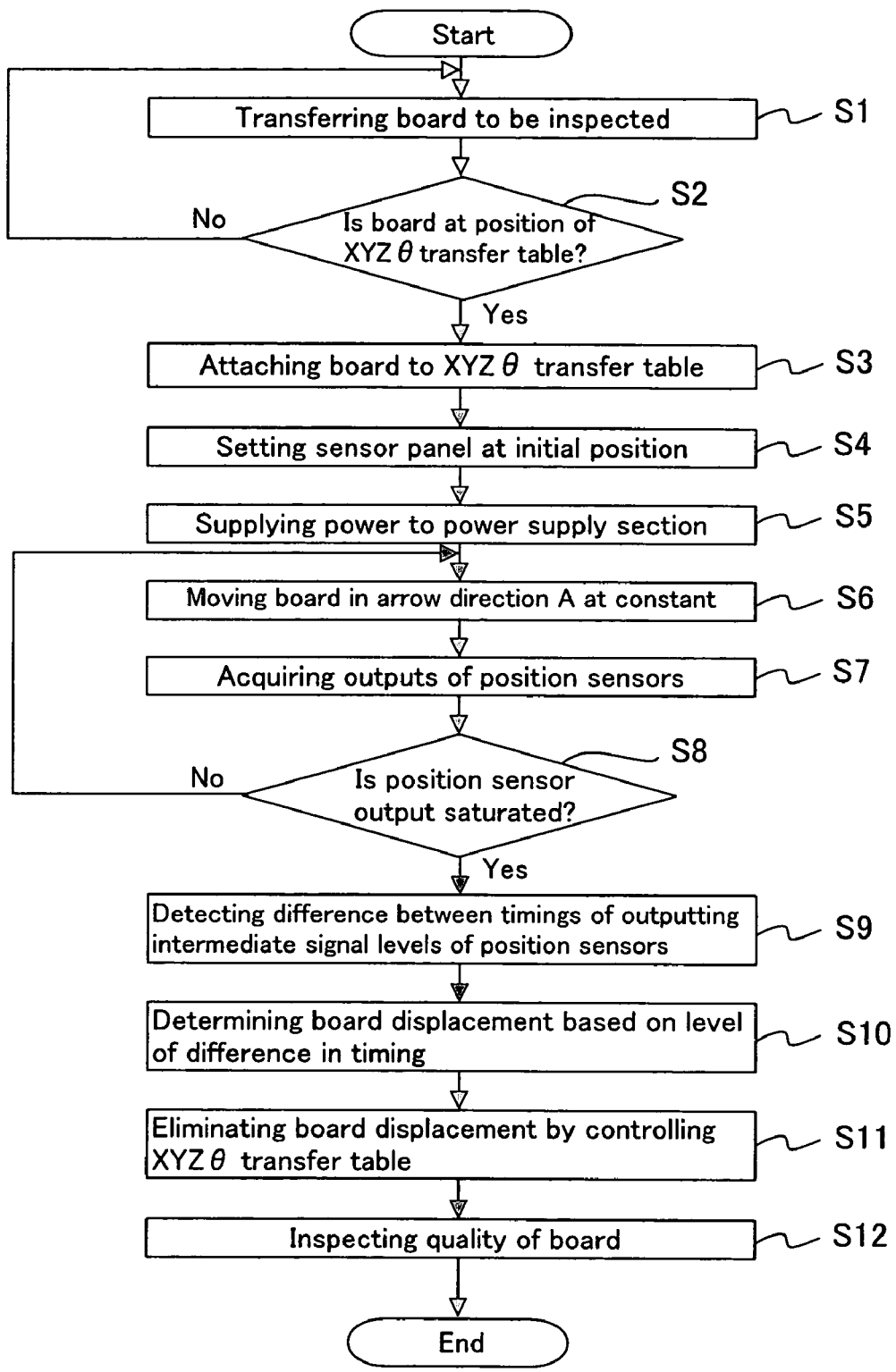
FIG. 2 is an explanatory flowchart of a control for detecting positional displacement of a board in the board-displacement detection apparatus according to the embodiment.

A control for detecting positional displacement of the board in the board-displacement detection apparatus according to the above embodiment will be described with reference to FIG. 2 which is an explanatory flowchart of the control.

In this embodiment, the board-displacement detection apparatus is located upstream of a board transfer path relative to a board inspection apparatus for inspecting the quality of the pattern of a board or the like to supply the board without positional displacement.

At Step S1, a board to be inspected is set on the transfer path, and transferred toward the board-displacement detection apparatus. At Step S2, it is checked whether the board arrives at the position of the XYZθ transfer table 30 of the board-displacement detection apparatus. If the board has not arrived at the position of the XYZθ transfer table 30, the process will return to Step S1 to continue the transfer.

When the arrival of the board to the position of the XYZθ transfer table 30 is confirmed in Step S2, the process advances to Step S3, and the board is positioned and held on the XYZθ transfer table 30.

Subsequently, at Step S4, the XYZθ transfer table 30 is controlled to set the board 20 at an initial position for allowing the position sensors 1, 2 and the power supply section 3 to be capacitively coupled with the conductive pattern in an operation of actually detecting positional displacement of the board. This initial position is set at a position where the positional sensors 1, 2 generate no sense signal (un-sensed position). Through the above Steps, the preparation for the board-displacement detecting operation has been completed. Then, at Step S5, the control section 11 activates the signal generator 14 to supply an AC signal (supply power) to the power supply section 3.

Subsequently, at Step S6, the XYZθ transfer table 30 is moved in the Y-direction (the arrow direction A in FIG. 1) at a constant speed. Simultaneously, at Step S7, the control section 11 drives the amplifier 12 and activates the A/D converter circuit 13 to convert the respective outputs of the position sensors 1, 2 into corresponding digital signals, and takes in the digital signals.

Then, Step S8, after the outputs of the position sensors 1, 2 are changed from the un-sensed state to a sensed state, it is monitored whether the outputs are saturated. If both outputs of the position sensors 1, 2 are not saturated, the process will return to Step S6 to continue the monitoring of the transfer of the board and the outputs of the position sensors 1, 2.

When the saturation of both outputs of the position sensors 1, 2 is confirmed in Step S8, the process advances to Step S9, and the levels of the sense signals of the position sensors 1, 2 are compared with one another. Specifically, for each of the sense signal levels, the signal output level at no output of any sense signal and the signal output level at the saturation of the output are compared with one another to determine the timing of the output of an approximately intermediate signal level. Then, the respective timings of sensing the intermediate signal levels in the position sensors 1, 2 are compared to detect which outputs of the position sensors is how much earlier, or the time difference between the respective timings of outputting the intermediate signal levels of the position sensors 1, 2.

Subsequently, Step S10, the level of positional displacement of the board is determined in accordance with the level of the time difference. In this embodiment, the AC signal is continuously supplied from the power supply section 3 to the conductive pattern formed on the surface of the board. Thus, the outputs of the position sensors 1, 2 as the result of sensing the AC signal from the power supply section 3 are increased as the conductive pattern gets close to the position sensors 1, 2. When the conductive pattern is fully aligned with the positions of the position sensors 1, 2, the level of the sense signal is maximized and saturated. Then, when the leading edge of the conductive pattern is located directly below the position sensors 1, 2 (directly below at the center of each of the position sensors because each has a symmetrical/diphycercal shape), each output of the sense signals has the intermediate level.

As above, since the difference between the sensing timings of the position sensors 1, 2 is proportion to positional displacement of the board, the time difference between the sensing timings of the position sensors 1, 2 are detected at Step S10 to determine the level of positional displacement of the board.

The processing of detecting the positional displacement in the above embodiment will be described in more detail with reference to FIG. 3 which is an explanatory view of the principle of detecting positional displacement of the board by the position sensors 1, 2 in the embodiment.

Figure 3:
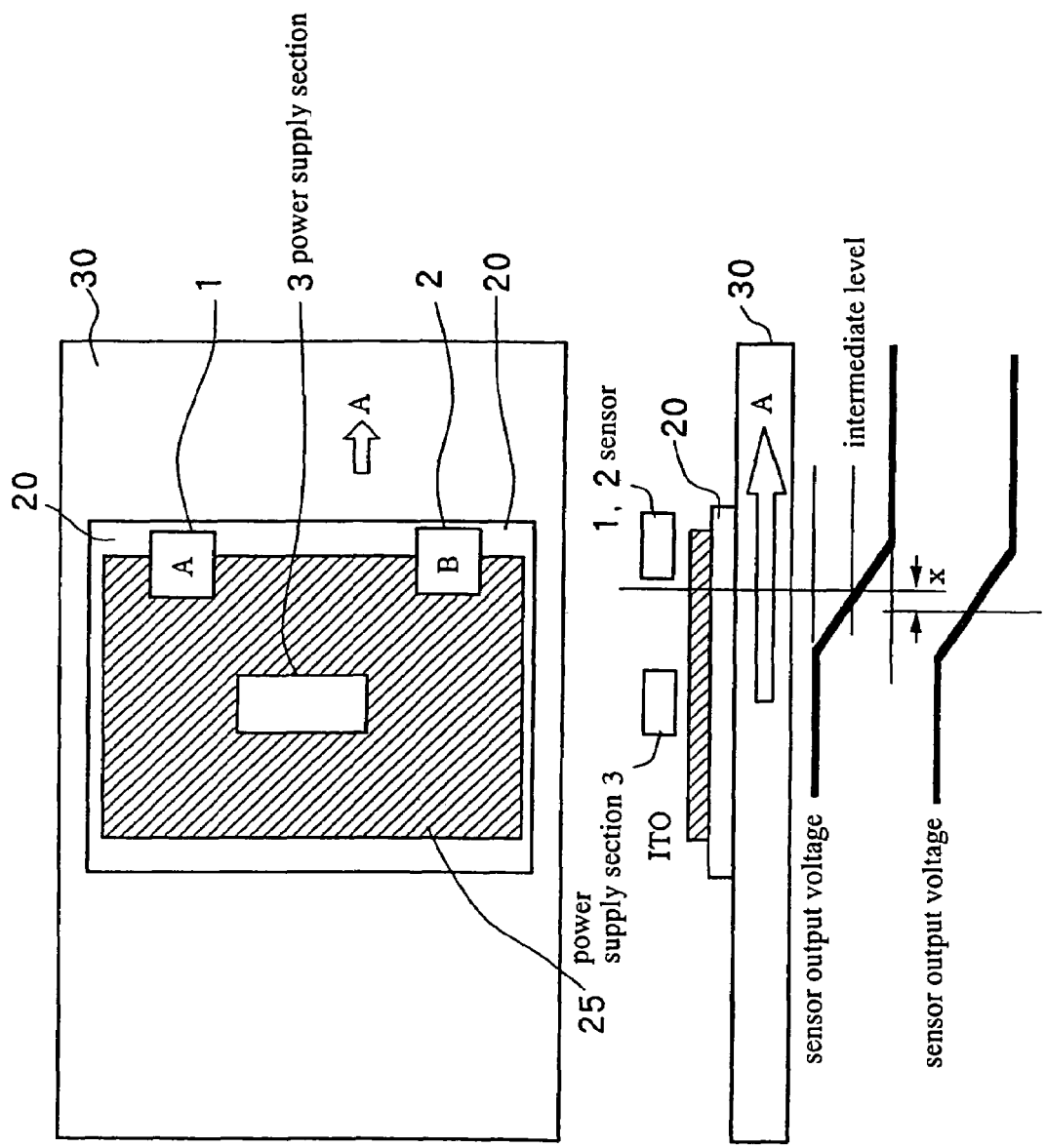
FIG. 3 is an explanatory diagram of the principle of detecting positional displacement of a board by position sensors 1, 2 according to the embodiment.

As shown in FIG. 3, the conductive pattern 25 is formed on the surface of the board 20. The power supply section 3 arrives at the position of the pattern 25 before the position sensors 1, 2 arrive at the position of the pattern 25, and the AC signal is continuously supplied to the power supply section 3 from Step S5.

Thus, when the XYZθ transfer table is moved in the arrow direction A, the conductive pattern 25 arrives at a position opposed to the sensors 1, 2, and the opposed area is gradually increased. When the conductive pattern is moved at a position fully opposed to the position sensors 1, 2, the sensing outputs of the position sensors 1, 2 are saturated. This state is shown at the bottom of FIG. 3.

If each of the position sensors 1, 2 is formed in a symmetrical shape in both the moving or transfer direction and the lateral direction, the position of the intermediate level of the sense signal will correspond to the state when the conductive pattern has been moved just to intermediate (center) positions of the position sensors 1, 2. Thus, the leading edge of the conductive pattern on the surface of the board can be accurately detected.

Then, the levels of sense signals of the position sensors 1, 2 are compared with one another to detect the difference x between the timings of the intermediate levels, and the difference x can be compared with the moving speed of the board 20 to detect the level of positional displacement of the board.

In addition, the above detecting operation can be performed completely in a non-contact manner. Thus, the level of the sense signal is proportional to the area of the conductive pattern opposed to the position sensor, and positional displacement of the board can be detected with an extremely high degree of accuracy.

Particularly, instead of using the absolute values of the sense signals as a reference value of the detection, the aforementioned embodiment is designed to detect the difference based on the relative comparison of the output signals of the position sensors 1, 2. Thus, a highly reliable detection result can be obtained without any adverse affects from deterioration or variation over time in the performance of the control section, the detection circuits 12, 13 and/or the signal generator 14.

Then, at Step S11, the XYZθ transfer table 30 is controlled to correct the displacement of the board so as to allow the board to be set at an accurate position. Then, at Step S15, the accurately positioned board can be subjected to the quality inspection. After the inspection, this processing will be competed.

Even if a plurality of boards are simultaneously mounted on the XYZθ transfer table 30, the above highly accurate displacement detection allows positional displacements in all of the boards to be accurately corrected by only one cycle of the board-displacement detecting operation.

While the ITO pattern has been used as the conductive pattern in the above embodiment, any type of conductive patterns may be used without any restriction if the opposed regions between the power supply section 3, the position sensors 1, 2 and the conductive pattern are connected with AC power.

For example, it is to be understood that the conductive pattern may be formed of an aluminum film as a substitute for the ITO film to perform the detecting operation in the same way. The difference in the material of the conductive pattern has little impact on the detecting, and any material may be used to perform the detecting operation in the same way. For example, copper, silver or gold may also be used.

Further, the embodiment illustrated in FIGS. 1 and 3 has employed the single power supply section 3. However, if the conductive pattern opposed to the position sensors 1, 2 is composed of two independent conductive pattern groups, the power supply section may be divided into two to supply power to the conductive pattern groups opposed to the corresponding position sensors 1, 2, separately.

The above embodiment is designed to detect the relative difference between the sense signals of the position sensors 1, 2. Thus, the power supply section is limited to the shape illustrated in FIG. 1 or 3, but may be formed in any shape. Further, instead of the non-contact type, probe-shaped power supply sections may be brought into direct contact with the conductive pattern to supply an AC signal thereto.

Moreover, the above embodiment is not designed to compare the absolute values of the sense signals so as to determine positional displacement of the board. Thus, there is no need for controlling the distance between the sensors and the conductive pattern strictly and accurately, and the control for setting the initial position at Step S4 can be performed without difficulties.

If it is desired to accurately control this distance, the following operation may be performed. The board is held by the XYZθ transfer table 30, and then the XYZθ transfer table 30 is once lifted toward the sensor panel. Then, it is checked whether the surface of the board 20 is in contact with the sensor panel. If the surface of the board is not in contact with the sensor panel, the XYZθ transfer table 30 is further lifted.

When the surface of the board 20 is in contact with the sensor panel, the XYZθ transfer table 30 is moved downward at a given distance. In this manner, the distance between the position sensor 1, 2, the power supply section 3 and the conductive pattern on the surface of the board may be accurately controlled. Further, the position sensor 1, 2 and the power supply section 3 can be capacitively coupled with the conductive pattern in a non contact manner, and the level of sense signal can be controlled in a given range.

INDUSTRIAL APPLICABILITY

As mentioned above, according to the present invention, instead of using the absolute values of sense signals in the board-positional displacement detecting operation, the level of positional displacement is detected in accordance with the relative comparison of the output signals from the pattern-edge sensing means. Thus, a highly reliable result of board-displacement detection can be obtained in a simple structure without any adverse affects from deterioration or variation over time in the performance of associated components.

What is claimed is:

1. An apparatus for detecting positional displacement of a board having a surface formed with a conductive pattern, relative to a direction orthogonal to a transfer direction thereof, said board, said apparatus comprising:

at least two pattern-edge sensing means disposed, respectively, at predetermined arrival positions which are spaced apart from each other at a given distance and to be aligned with the leading edge of said conductive pattern located downstream relative to said transfer direction, and adapted to be capacitively coupled with said conductive pattern in a non-contact manner;

signal supply means for supplying an AC signal from a given portion of said conductive pattern other than said leading edge to said leading edge; and displacement determination means for detecting the difference between respective timings when said AC signal supplied from said signal supply means is sensed by said pattern-edge sensing means, to determine the positional displacement of said board transferred to said predetermined arrival positions, wherein said signal supply means is operable to supply said AC signal at least at the time when said leading edge of said conductive pattern arrives at said predetermined arrival positions, and said displacement determination means is operable to determine the level of inclination of said board in accordance with the level of the difference between said sense signals.

2. The apparatus as defined in claim 1, wherein said displacement determination means is operable to detect the respective arrival positions of said leading edge to said pattern-edge sensing means, in accordance with the positions of the respective approximately intermediate levels between the minimum and maximum levels in said sense signals from said pattern-edge sensing means, to determine the inclination relative to the line between the positions of said pattern-edge sensing means and the displacement relative to said transfer direction, in accordance with the difference between said sense signals from said pattern-edge sensing means.

3. The apparatus as defined in claim 1 or 2, wherein said signal supply means includes capacitive coupling means for supplying said AC signal to said given portion of said conductive pattern in a non-contact manner.

4. The apparatus as defined in claim 1 or 2, wherein said board is a board for a liquid-crystal display panel, and said conductive pattern is an indium tin oxide film.

5. The apparatus as defined in claim 1 or 2, wherein said board is a board for a liquid-crystal display panel, and said conductive pattern is an aluminum film.

6. The apparatus as defined in claim 4, wherein said board is made of glass or plastic.

7. A method for detecting positional displacement of a board having a surface formed with a conductive pattern, relative to a direction orthogonal to a transfer direction thereof, said method comprising the steps of:

providing at least two pattern-edge sensing means disposed, respectively, at predetermined arrival positions which are spaced apart from each other at a given distance and to be aligned with the leading edge of said conductive pattern located downstream relative to said transfer direction, and adapted to be capacitively coupled with said conductive pattern in a non-contact manner;

supplying an AC signal to said conductive pattern;

sensing said AC signal supplied to said conductive pattern of said board transferred to said predetermined arrival positions, through said pattern-edge sensing means; and detecting the difference between respective timings when said AC signal is sensed by said pattern-edge sensing means to determine the positional displacement of said board transferred to said predetermined arrival positions.

8. The method as defined in claim 7, wherein said detecting step includes detecting the respective arrival positions of said leading edge to said pattern-edge sensing means, in accordance with the positions of the respective approximately intermediate levels between the minimum and maximum levels in said sense signals from said pattern-edge sensing means, to determine the inclination relative to the line between the positions of said pattern-edge sensing means and the displacement relative to said transfer direction, in accordance with the difference between said sense signals from said pattern-edge sensing means.

9. The method as defined in claim 7 or 8, wherein said supplying step includes supplying said AC signal to said conductive pattern through capacitive coupling means in a non-contact manner.

10. The apparatus as defined in claim 5, wherein said board is made of glass or plastic.

\* \* \* \* \*